United States Patent
Mitsuoka et al.

(10) Patent No.: US 8,642,178 B2
(45) Date of Patent: Feb. 4, 2014

(54) VEHICLE MEMBER AND PROCESS FOR PRODUCING THE SAME

(75) Inventors: Tetsuya Mitsuoka, Kariya (JP); Hidetaka Hayashi, Kariya (JP); Toshihisa Shimo, Kariya (JP); Kyoko Kumagai, Kariya (JP); Naoharu Ueda, Kariya (JP); Kazumasa Inata, Nagoya (JP); Takeshi Fujita, Nagoya (JP); Yasuyuki Sanai, Nagoya (JP); Eiichi Okazaki, Nagoya (JP); Hiroshi Suzuki, Nagoya (JP); Naomasa Furuta, Nagoya (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 103 days.

(21) Appl. No.: 13/502,911

(22) PCT Filed: Oct. 13, 2010

(86) PCT No.: PCT/JP2010/006078
§ 371 (c)(1),
(2), (4) Date: Apr. 19, 2012

(87) PCT Pub. No.: WO2011/048775
PCT Pub. Date: Apr. 28, 2011

(65) Prior Publication Data
US 2012/0244361 A1 Sep. 27, 2012

(30) Foreign Application Priority Data
Oct. 21, 2009 (JP) .................................. 2009-242830

(51) Int. Cl.
*B32B 27/40* (2006.01)
*B32B 27/30* (2006.01)
*C08J 7/04* (2006.01)

(52) U.S. Cl.
USPC ......... 428/422.8; 428/446; 428/447; 427/520

(58) Field of Classification Search
USPC ....................... 428/422.8, 446, 447; 427/520
See application file for complete search history.

(56) References Cited

U.S. PATENT DOCUMENTS

| 6,306,502 B1 | 10/2001 | Fukushima et al. |
| 8,530,546 B2 * | 9/2013 | Inata et al. .................... 523/213 |
| 2004/0087711 A1 | 5/2004 | Matsumura et al. |

FOREIGN PATENT DOCUMENTS

| JP | 58-129018 A | 8/1983 |
| JP | 02-129235 A | 5/1990 |
| JP | 04-018423 A | 1/1992 |
| JP | 07-109355 A | 4/1995 |
| JP | 2000-063549 A | 2/2000 |

(Continued)

*Primary Examiner* — Thao T. Tran
(74) *Attorney, Agent, or Firm* — Sughrue Mion, PLLC

(57) ABSTRACT

Disclosed is a vehicle member comprising a resin substrate and a protective film formed on at least a part of the surface of the resin substrate. The protective film is produced by curing a curable coating agent composition, wherein the curable coating agent composition comprises 95 to 65 parts by mass of a component (A) comprising an urethane adduct compound having weather resistance, 5 to 35 parts by mass of a component (B) comprising a specific organosilicon compound, 0.1 to 10 parts by mass of a component (C) which is a radical polymerization initiator, 1 to 12 parts by mass of a component (D) which is an ultraviolet ray absorber, and 10 to 1,000 parts by mass of a component (E) which is an organic solvent, with respect to 100 parts by mass of the components (A) and (B) in total.

13 Claims, 1 Drawing Sheet

(56) References Cited

FOREIGN PATENT DOCUMENTS

| | | |
|---|---|---|
| JP | 2000-063701 A | 2/2000 |
| JP | 2000-273128 A | 10/2000 |
| JP | 2001-214122 A | 8/2001 |
| JP | 2002-038058 A | 2/2002 |
| JP | 2003-213159 A | 7/2003 |
| JP | 3747065 A | 2/2006 |
| JP | 3747065 B2 | 2/2006 |
| JP | 2010-059229 A | 3/2010 |
| WO | 97/11129 A | 3/1997 |
| WO | 97/11129 A1 | 3/1997 |

\* cited by examiner

VEHICLE MEMBER AND PROCESS FOR PRODUCING THE SAME

CROSS REFERENCE TO RELATED APPLICATION

This application is a National Stage of International Application No. PCT/JP2010/006078 filed Oct. 13, 2010, claiming priority based on Japanese Patent Application No. 2009-242830 filed Oct. 21, 2009, the contents of all of which are incorporated herein by reference in their entirety.

TECHNICAL FIELD

The present invention relates to a vehicle member which requires high abrasion resistance and weather resistance, such as interior and exterior materials of a vehicle, exterior body panels of a vehicle and resin windows, and a process for producing the vehicle member.

BACKGROUND ARTS

Resin materials, especially transparent resin materials represented by polycarbonate and the like have such characteristics as low specific gravity, low weight, easy processability, and better impact resistance compared with inorganic glass, and therefore are widely used in various applications. Recently, from the viewpoints of saving petroleum sources and reducing carbon dioxide discharge quantity, a tendency to attempt to lower the weight of vehicle window glasses, interior and exterior materials and the like by replacing with plastics and to improve fuel efficiency is increasing.

To the contrary, a resin material has disadvantages, such as, the surface thereof is easily damaged and the gloss or transparency is easily lost, it is easily invaded by organic solvents, and its weather resistance (for example, light stability with regard to rays such as ultraviolet rays) and heat resistance are poor, etc. Window glasses and the like for vehicle are often exposed to sunlight for a long period of time. Accordingly, in the case of using a resin material for a vehicle member, it is necessary to provide its surface with abrasion resistance and weather resistance by means of covering the surface with a protective film and so on.

As a protective film having excellent abrasion resistance and weather resistance, for example, a hard coating layer obtained by curing a light-curing coating agent composition may be exemplified.

As a light-curing coating agent composition having both abrasion resistance and weather resistance, a composition for forming an abrasion-resistant coating is known (patent document 1), which contains colloidal silica particles whose surfaces are modified with a silane compound having a methacryloyloxy group, an acryloyloxy group or a vinyl group in predetermined proportion by weight, a monomer mixture comprising a poly[(meth)acryloyloxyalkyl]isocyanurate and a urethane (poly)methacrylate having an alicyclic skeleton, and a photopolymerization initiator, in a specific proportion.

Furthermore, a coating agent composition is also known (patent document 2), which contains, in specific proportion, a poly(meth)acrylate of mono- or poly-pentaerythritol, a urethane poly(meth)acrylate having at least two radical polymerizable unsaturated double bonds, a poly[(meth)acryloyloxyacryl](iso)cyanurate, an ultraviolet absorber, a hindered amine based light stabilizer and a photopolymerization initiator.

There is also an example in which a thermocuring coating agent composition is used. In patent document 3, a plastic article is disclosed, wherein the plastic article comprises, on a surface thereof, a first layer formed by curing a thermocuring undercoating composition having an excellent weather resistance, and a second layer on the first layer formed by curing a thermocuring coating agent composition having an excellent abrasion resistance.

PRIOR ART DOCUMENTS

Patent Documents

Patent document 1: Japan Patent No. 3747065
Patent document 2: Japan Unexamined Patent Application Publication No. 2000-063701
Patent document 3: Japan Unexamined Patent Application Publication No. 2001-214122

SUMMARY OF THE INVENTION

Problems to be Solved by the Invention

The plastic article disclosed in patent document 3 has both abrasion resistance and weather resistance on a high level. However, a thermocuring composition, compared to a light-curing composition, has problems, such as, that a large amount of energy is required to form a cured article, and the efficiency is poor because it is time-consuming for heating, etc. Furthermore, in the case of using not only a coating agent composition but also an undercoating composition as patent document 3, the number of steps is increased, and therefore it is not desirable from the viewpoint of productivity. Therefore, a coating agent composition, which enables a protective film having sufficient abrasion resistance and weather resistance to be formed without using an undercoating composition, is eagerly required.

When a light-curing composition is used, production with good efficiency is possible. The above-mentioned urethane (poly)methacrylate having an alicyclic skeleton is a component capable of improving weather resistance of a hard coating layer; however, its abrasion resistance is insufficient. In patent document 1, the urethane (poly)methacrylate is used along with the colloidal silica particles; however, each embodiment shows a haze value of 10 or more, accordingly, it is believed to be difficult to further improve the abrasion resistance.

On the other hand, the above-mentioned hard coating layer formed by curing a poly(meth)acrylate of mono- or poly-pentaerythritol shows a high hardness. Therefore, in patent document 2, the component is used in combination with a urethane poly(meth)acrylate which is a component for improving weather resistance and has at least two radical polymerizable unsaturated double bonds. However, as a result of research by the present inventors, it is found that it is unable to stand a further-long-time accelerated test by simply using a component for improving abrasion resistance and a component for improving weather resistance in combination.

That is, even if a hard coating layer is formed on a surface of a resin substrate by using the above-mentioned light-curing coating agent composition, it is difficult to achieve both abrasion resistance and weather resistance on a high level.

In light of the above-mentioned problems, an object of the present invention is to provide a vehicle member which has a protective film, showing excellent abrasion resistance and weather resistance, on a surface of a resin substrate.

Means for Solving the Problems

As a result of the extensive study conducted by the present inventors, it is found that a protective film, formed by curing a composition in which a urethane adduct compound having an excellent weather resistance is used in combination with a specific organic silicon compound in a specific proportion and an adequate amount of additive is added, shows an excellent abrasion resistance while keeping a weather resistance on a high level, and therefore the present invention is achieved.

That is, a vehicle member in accordance with the present invention has a resin substrate and a protective film which is formed on at least part of a surface of the resin, wherein
said protective film is formed by curing a curable coating agent composition which contains, with respect to 100 parts by mass of following component (A) and following component (B) in total, 95 to 65 parts by mass of said component (A), 5 to 35 parts by mass of said component (B), 0.1 to 10 parts by mass of a radical polymerization initiator as component (C), 1 to 12 parts by mass of an ultraviolet absorber as component (D), and 10 to 1,000 parts by mass of an organic solvent as component (E).

Component (A):

Component (A) is an isocyanuric ring-containing (meth) acrylate mixture comprising a urethane adduct compound (a1) obtained by addition reaction of a hydroxyl-containing di(meth)acrylate compound represented by following general formula (1) and an isocyanate compound having two or more isocyanate groups in its molecule, and
a tri(meth)acrylate compound (a2) represented by following general formula (2).

[Chem 1]

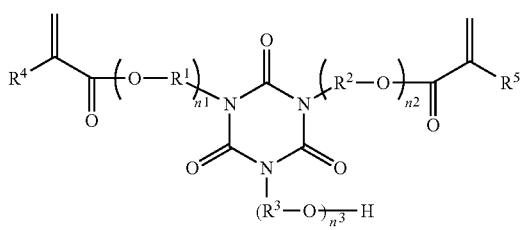

(1)

(In general formula (1), $R^1$, $R^2$ and $R^3$ each independently represents a divalent organic group having a carbon atom number of 2 to 10, $R^4$ and $R^5$ each independently represents a hydrogen atom or a methyl group, $n^1$, $n^2$ and $n^3$ each independently represents a number of 1 to 3, and $n^1+n^2+n^3=3$ to 9.)

[Chem 2]

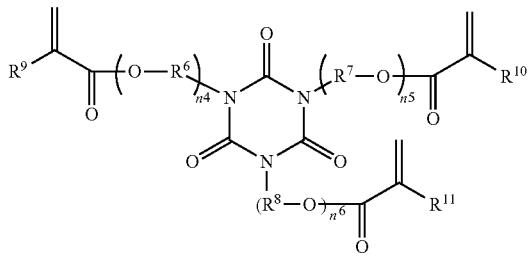

(2)

(In general formula (2), $R^6$, $R^7$ and $R^8$ each independently represents a divalent organic group having a carbon atom number of 2 to 10, $R^9$, $R^{10}$ and $R^{11}$ each independently represents a hydrogen atom or a methyl group, $n^4$, $n^5$ and $n^6$ each independently represents a number of 1 to 3, and $n^4+n^5+n^6=3$ to 9.)

Component (B):

Component (B) is an organosilicon compound obtained by hydrolyzing and co-polycondensing a silicon compound (b1) represented by following general formula (3) and a silicon compound (b2) represented by following general formula (4) in a ratio of 0.3 to 1.8 mol of the compound (b2) with respect to 1 mol of compound (b1).

[Chem 3]

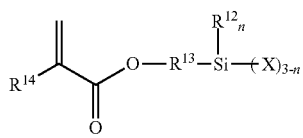

(3)

(In general formula (3), $R^{12}$ is an organic group having an alkyl group having a carbon atom number of 1 to 6, an aralkyl group having a carbon atom number of 7 to 10, or an aryl group having a carbon atom number of 6 to 10, $R^{13}$ is a divalent saturated hydrocarbon group having a carbon atom number of 1 to 6, $R^{14}$ is a hydrogen atom or a methyl group, X is a hydrolyzable group and the X's may be the same or different, and n is 0 or 1.)

$$SiY_4 \quad (4)$$

(In general formula (4), Y is a siloxane-bond-forming group, and Y's may be the same or different.)

The vehicle member in accordance with the present invention has a protective film formed by curing a composition in which the component (A) showing an excellent weather resistance and the component (B) being a novel inorganic additive are used and each of the above-mentioned components (A) to (E) is mixed in a specific proportion, and hence, it is possible to fabricate a cured film having an excellent abrasion resistance without damaging the weather resistance possessed by component (A). The vehicle member having such a protective film on its surface has not only abrasion resistance, but also sufficient weather resistance even if it is exposed to sunlight for a long period of time.

Moreover, the curable coating agent composition to be used contains component (B) as an inorganic additive, however, its mixing proportion is relatively low. Therefore, it is believed that the protective film shows an excellent adhesion with respect to a surface of a resin substrate.

It is possible to perform curing at low energy in a short period of time by curing the curable coating agent composition by irradiating with light. Moreover, by specifying the mixing proportion and furthermore the kind of an ultraviolet absorber, even if the composition is irradiated with light to cure, curing is conducted well and the vehicle member having a protective film which has excellent abrasion resistance, weather resistance, and adhesion with a resin substrate.

Effects of the Invention

The vehicle member in accordance with the present invention has, on a surface of a resin substrate, a protective film formed by curing a specific curable coating agent composition, and hence exerts excellent abrasion resistance and weather resistance.

EMBODIMENT MODES OF THE INVENTION

Figure 1:
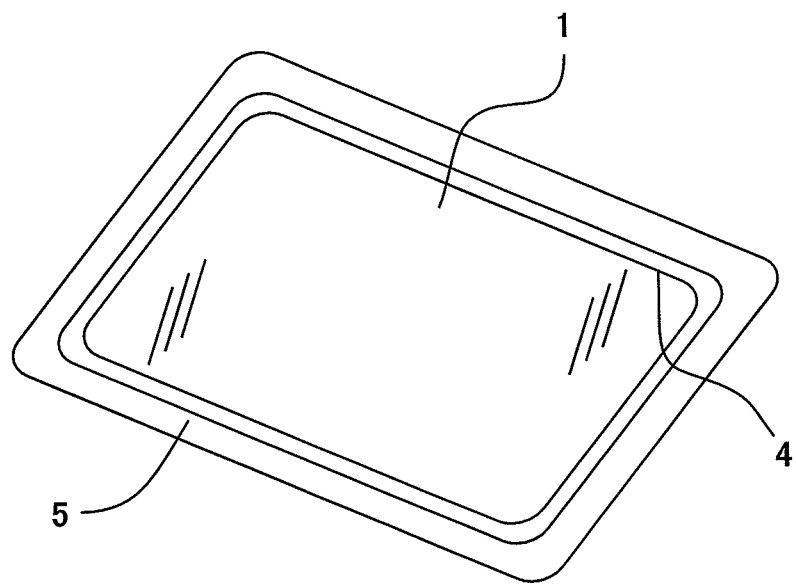
FIG. 1 is a schematic perspective view showing a sunroof in which a vehicle member in accordance with the present invention is used.

The best modes for carrying out the vehicle member in accordance with the present invention will be described as follows. In addition, unless stated otherwise, a value range of "x to y" described in the present specification contains in its range the lower limit x and the upper limit y. Furthermore, a value range may be obtained by arbitrarily combining these upper and lower limits, as well as the values mentioned in the embodiments.

The vehicle member in accordance with the present invention has a resin substrate and a protective film formed on at least part of a surface of the resin substrate. The protective film is formed by curing an curable coating agent composition as described hereafter.

<A Curable Coating Agent Composition>

A curable coating agent composition (simply referred to as "composition" as appropriate) contains, with respect to 100 parts by mass of following component (A) and following component (B) in total, 95 to 65 parts by mass of the component (A), 5 to 35 parts by mass of the component (B), 0.1 to 10 parts by mass of a radical polymerization initiator as component (C), 1 to 12 parts by mass of an ultraviolet absorber as component (D), and 10 to 1,000 parts by mass of an organic solvent as component (E). In the following, the details of each component and the composition will be described.

In addition, in the present specification, an acryloyl group or a methacryloyl group is described as a "(meth)acryloyl group", and an acrylate or a methacrylate is described as a "(meth)acrylate".

<Component (A)>

The component (A) is an isocyanuric ring-containing (meth)acrylate mixture comprising a urethane adduct compound (a1) (hereinafter referred to as "component (a1)"), and a tri(meth)acrylate compound (a2) (hereinafter referred to as "component (a2)").

The component (a1) is obtained by an addition reaction of a hydroxy group-containing di(meth)acrylate compound represented by following general formula (1) (hereinafter referred to as "di(meth)acrylate (1)") with an isocyanate compound having two or more isocyanate groups in its molecule (hereinafter referred to as "polyisocyanate").

[Chem 4]

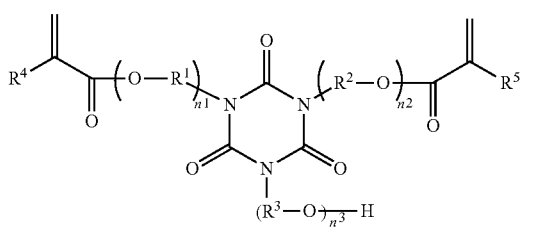

(1)

In general formula (1) representing di(meth)acrylate (1), $R^1$, $R^2$ and $R^3$ each independently represents a divalent organic group having a carbon atom number of 2 to 10.

As a divalent organic group having a carbon atom number of 2 to 10, an alkylene group having carbon atom number of 2 to 4 such as an ethylene group, a trimethylene group, a propylene group and a tetramethylene group is preferable. Furthermore, a compound obtained by modifying a compound of general formula (1) having these groups with ε-caprolactone is also included. In this case, a divalent organic group having a carbon atom number of 2 to 10 includes —$COCH_2CH_2CH_2CH_2CH_2$—.

Among these compounds, it is especially preferable if all of $R^1$, $R^2$ and $R^3$ are ethylene groups, because a protective film having excellent abrasion resistance and weather resistance can be obtained.

In general formula (1), $R^4$ and $R^5$ each independently represents a hydrogen atom or a methyl group, and from the viewpoint that a composition has excellent curability, a compound wherein both $R^4$ and $R^5$ are hydrogen atom is especially preferable.

$n^1$, $n^2$ and $n^3$ each independently represents a number of 1 to 3. And wherein, $n^1+n^2+n^3=3$ to 9. $n^1$, $n^2$ and $n^3$ are preferably 1, and $n^1+n^2+n^3$ is preferably 3.

Preferably, di(meth)acrylate (1) is manufactured by reacting (meth)acrylic acid with an alkylene oxide adduct of isocyanuric acid. $n^1+n^2+n^3$ represents the mean addition molar number of alkylene oxide per molecule of di(meth)acrylate (1).

As polyisocyanates, various compounds may be used.

Preferably, a polyisocyanate is a compound free of an aromatic ring from the viewpoint of weather resistance of a protective film.

Examples of preferable polyisocyanates may include isophorone diisocyanate, hexamethylene diisocyanate, 4,4'-dicyclohexylmethane diisocyanate, norbornane diisocyanate and their nurate-based trimers.

The component (a1) is synthesized by addition reaction of above-mentioned di(meth)acrylate (1) and polyisocyanate. The addition reaction may be conducted without catalyst, however, a tin based catalyst such as dibutyltin dilaurate and so on or an amine based catalyst such as triethylamine and so on may be added to carry out the reaction effectively.

The component (a2) may be represented by following general formula (2).

[Chem 5]

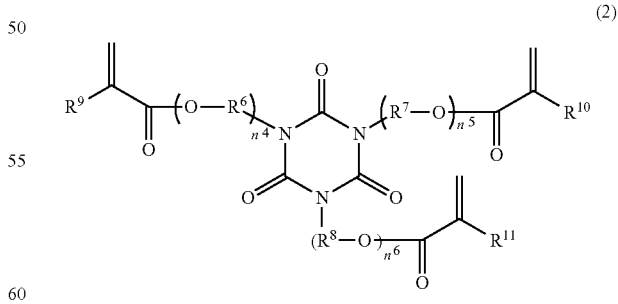

(2)

In general formula (2) representing the compound (a2), $R^6$, $R^7$ and $R^8$ each independently represents a divalent organic group having a carbon atom number of 2 to 10.

As a divalent organic group having a carbon atom number of 2 to 10, an alkylene group having a carbon atom number of 2 to 4, such as an ethylene group, a trimethylene group, a propylene group, a tetramethylene group, and the like, is preferable. Furthermore, a compound formed by modifying a compound of general formula (2) having these groups with ε-caprolactone is also included. In this case, a divalent organic group having a carbon atom number of 2 to 10 includes —COCH$_2$CH$_2$CH$_2$CH$_2$CH$_2$—.

Among these compounds, it is especially preferable that all of $R^6$, $R^7$ and $R^8$ are ethylene groups, because a protective film having excellent abrasion resistance and weather resistance can be obtained.

In general formula (2), $R^9$, $R^{10}$ and $R^{11}$ each independently represents a hydrogen atom or a methyl group, and a compound wherein all of $R^9$, $R^{10}$ and $R^{11}$ are hydrogen atoms is especially preferable from the viewpoint that a composition has an excellent curability.

$n^4$, $n^5$ and $n^6$ each independently represents a number of 1 to 3. And wherein $n^4+n^5+n^6=3$ to 9. $n^4$, $n^5$ and $n^6$ are preferably 1, and $n^4+n^5+n^6$ is preferably 3.

Preferably, the component (a2) is manufactured by reacting (meth)acrylic acid with an alkylene oxide adduct of isocyanuric acid. $n^4+n^5+n^6$ represents the mean addition molar number of alkylene oxide per molecule of the component (a2).

The component (A) is a mixture of the component (a1) and the component (a2).

The proportion of the component (a1) and the component (a2) can be properly set based on purpose; however, it is preferably that a mixture comprises the component (a1) and the component (a2) in a proportion by mass of (a1):(a2)=1:9 to 7:3, and it is more preferable that a mixture comprises the component (a1) and the component (a2) in a proportion by mass of (a1):(a2)=2:8 to 5:5, further preferably 2:8 to 4:6.

By setting the mass ratio of (a1) and (a2) into this range, a composition having excellent abrasion resistance and weather resistance after being cured can be obtained.

The content proportion of the component (A) in a composition, with respect to 100 parts by mass of the component (A) and the component (B) in total, is 95 to 65 parts by mass, more preferably 90 to 70 parts by mass.

By setting the content proportion of the component (A) to be 95 to 65 parts by mass, a cured film having excellent abrasion resistance and weather resistance can be obtained.

<Component (B)>

The component (B) is an organosilicon compound obtained by hydrolyzing and co-polycondensing a silicon compound (b1) and a silicon compound (b2) having mutually different structures.

The silicon compound (b1) may be represented by following general formula (3).

[Chem 6]

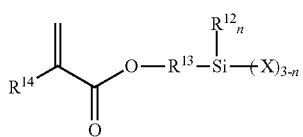

(3)

In general formula (3), $R^{12}$ is an organic group having an alkyl group having a carbon atom number of 1 to 6, an aralkyl group having a carbon atom number of 7 to 10, or an aryl group having a carbon atom number of 6 to 10.

Among these compounds, an alkyl group having a carbon atom number of 1 to 6 is preferable, and a methyl group is more preferable from the viewpoint that a protective film has an excellent abrasion resistance.

$R^{13}$ is a divalent saturated hydrocarbon group having a carbon atom number of 1 to 6, and preferably is an alkylene group. As an alkylene group, trimethylene group is more preferable not only from the viewpoint that a protective film having an excellent abrasion resistance can be obtained, but also from the viewpoint of the raw material cost. $R^{14}$ is a hydrogen atom or a methyl group.

X is a hydrolyzable group, and the X's may be the same or different. A hydrolyzable group can be various groups having hydrolyzability. Specifically, a hydrogen atom, an alkoxy group, a cycloalkoxy group, an aryloxy group and an aryalkoxy group can be exemplified. Among these groups, an alkoxy group is preferable, and an alkoxy group having a carbon atom number of 1 to 6 is more preferable. Specific examples of an alkoxy group may include a methoxy group, an ethoxy group, a propoxy group, a butoxy group, a pentyloxy group and a hexyloxy group, etc.

Furthermore, n is 0 or 1, and preferably is 0 from the viewpoint that a protective film has an excellent abrasion resistance.

In general formula (3), specific examples of a preferable compound wherein n is 0 and X is an alkoxy group may include 2-(meth)acryloyloxyethyl triethoxysilane, 3-(meth)acryloyloxypropyl trimethoxysilane and 3-(meth)acryloyloxypropylethyl triethoxysilane, and the like.

Silicon compound (b2) may be represented by following general formula (4).

(4)

In general formula (4), Y is a siloxane-bond-forming group, and the siloxane-bond-forming groups in one molecule may be the same or different.

As a siloxane-bond-forming group, an alkoxy group is preferable. Preferable examples of an alkoxy group may include an alkoxy group having a carbon atom number of 1 to 4, such as a methoxy group, an ethoxy group, an n-propoxy group, an iso-propoxy group, an n-butoxy group and a sec-butoxy group, and the like.

Specific examples of preferable compound (b2) may include an alkoxysilane compound having an n-propoxy group, such as tetra-n-propoxysilane, trimethoxy-n-propoxysilane, dimethoxy di-n-propoxysilane, and methoxy tri-n-propoxysilane, and the like.

The alkoxysilane compound having an n-propoxy group may be one kind of compound, or may be a mixture of compounds having an n-propoxy group and another alkoxy group.

The mixture of an alkoxysilane compound having an n-propoxy group can use various kinds of components by mixing them, and can also use a mixture, as it is, manufactured by alcohol exchange. For example, it may be obtained by subjecting a compound being one represented by above-mentioned general formula (4) without an n-propoxy group (for example, tetramethoxysilane) to an alcohol exchange reaction in 1-propanol. Moreover, a reaction product obtained by this reaction can be used as it is.

The synthesis of the component (B) may be achieved by hydrolyzing and co-polycondensing the above-mentioned silicon compound (b1) and the above-mentioned silicon compound (b2) in a predetermined proportion under alkali conditions. In the following, the step of hydrolyzing and co-polycondensing is referred to as a first step.

Regarding the proportion of the silicon compound (b1) and the silicon compound (b2), the silicon compound (b2) is 0.3 to 1.8 mol, preferably 0.8 to 1.8 mol, and further preferably 1 to 1.8 mol, with respect to 1 mol of the silicon compound (b1). By reacting in this range, hydrolysis and co-polycondensation may proceed well, and the component (B) can be effectively produced without gelation during and after reaction. The component (B) produced without gelation has improved dispersibility when being mixed as a composition, and hence the appearance of a protective film is improved.

Said first step is preferably a reaction under alkali conditions, and the pH value of a reaction liquid is preferably greater than 7. The pH value of a reaction liquid is preferably 8 or greater, and further preferably the pH value is 9 or greater. In addition, the upper limit is generally pH13. By making the reaction system has said pH value, the component (B) having an excellent storage stability can be produced with a high yield.

An organosilicon compound obtained by hydrolysis and co-polycondensation under acidic conditions (pH value being less than 7) is not preferable because it has poor storage stability, and in some cases, gelation occurs during storage depending on reaction conditions etc.

Furthermore, under neutral conditions (about pH7), it is difficult for hydrolysis and co-polycondensation to proceed, and it is impossible to obtain an organosilicon compound with good yield.

The condensation ratio of the compound (b1) and the compound (b2) in the first step can be to 92% or more, more preferably 95% or more, and further preferably 98% or more. It is the most preferable that a siloxane-bond-forming group (including a hydrolyzable group) is substantially completely condensed, however, the upper limit of condensation ratio is generally 99.9%.

In the first step, a polymerization inhibitor for inhibiting the polymerization of (meth)acryloyl group can be added into at least one of a reaction system, a reaction liquid comprising component (B), a neutralization liquid, an organic liquid and an organic solution.

A method for producing an organosilicon compound, such as one under acidic conditions, is also known, however, it is difficult to homogeneously react both the compound (b1) and the compound (b2) as raw materials, and gelation is easy to occur. Accordingly, a method which prevents gelation by using a silicon compound having only one siloxane-bond-forming group (hereinafter referred to as "M monomer") such as trimethylalkoxysilane, hexamethyldisiloxane or the like as a termination agent is known.

However, by using the M monomer at a predetermined amount or more in combination, the inorganic properties of a resultant organosilicon compound tend to deteriorate, although gelation can be prevented from occurring.

On the other hand, if the reaction is conducted at alkali conditions as described, the compound (b1) and the compound (b2) can be co-polycondensated without gelation, hence the inorganic properties may be maintained, and therefore an effect that the abrasion resistance of a cured film obtained from the composition will not be lowered can be achieved.

The component (B) is produced by having said first step as a necessary step, however, the following steps can be further included as required.

(A second step) a step of neutralizing the reaction liquid obtained in the first step with an acid.
(A third step) a step of removing a volatile component from the neutralized liquid obtained in the second step.
(A fourth step) a step of solving at least the organosilicon compound (B) into an organic solvent for cleaning by mixing and contacting the condensate obtained in the third step with the organic solvent for cleaning.
(A fifth step) a step of obtaining an organic solution containing the organosilicon compound (B) after cleaning the organic liquid obtained in the fourth step by water.
(A sixth step) a step of removing a volatile component from the organic solution obtained in the firth step.

A method of producing the component (B) preferably includes at least the first step, the second step and the fifth step.

The content proportion of the component (B) in the composition is 5 to 35 parts by mass, and more preferably 10 to 30 parts by mass, with respect to 100 parts by mass of the component (A) and the component (B) in total.

By making the content proportion of the component (B) to be 5 to 35 parts by mass, a protective film having excellent abrasion resistance and weather resistance can be obtained. When the proportion of the component (B) is 5 parts by mass or more, the abrasion resistance of a protective film is improved. However, if the component (B) is excessive, the protective film is easily to be shrunk or the organic components of the protective film is decomposed quickly, thereby the weather resistance becomes poor.

<Component (C): Radical Polymerization Initiator>

The component (C) is a radical polymerization initiator, and various compounds can be adopted.

If a radical photopolymerization initiator is used as the component (C), the composition functions as a light-curing coating agent composition and is cured by light irradiation. If a radical thermal polymerization initiator is used as the component (C), the composition functions as a thermocuring coating agent composition and is cured by heating.

The composition used in the present invention is preferably a light-curing coating agent composition using a radical photopolymerization initiator as the component (C) for having an excellent curability, for example, being capable of being cured in a short period of time with low energy.

Specific examples of the radical photopolymerization initiator include: acetophenone based compounds, such as 2,2-dimethoxy-1,2-diphenylethane-1-one, 1-hydroxycyclohexyl-phenyl-ketone, 2-hydroxy-2-methyl-1-phenyl-propane-1-one, 1-[4-(2-hydroxyethoxy)-phenyl]-2-hydroxy-2-methyl-1-propane-1-one, 2-methyl-1-[4-(methylthio) phenyl]-2-morpholinopropane-1-one, 2-benzyl-2-dimethylamino-1-(4-morpholinophenyl)-butane-1-one, diethoxyacetophenone, oligo {2-hydroxy-2-methyl-1-[4-(1-methylvinyl)phenyl]propanone} and 2-hydroxy-1-{4-[4-(2-hydroxy-2-methylpropionyl)benzyl]phenyl}-2-methyl-propane-1-one, and the like; benzophenone based compounds, such as benzophenone, 4-phenylbenzophenone, 2,4,6-trimethylbenzophenone and 4-benzoyl-4'-methyl-diphenylsulfide, and the like; α-ketoester based compounds, such as methyl benzoylformate, 2-(2-oxo-2-phenylacetoxyethoxy) ethyl ester of oxyphenyl acetic acid and 2-(2-hydroxyethoxy) ethyl ester of oxyphenyl acetic acid, and the like; phosphine oxide based compounds, such as 2,4,6-trimethylbenzoyl diphenyl phosphine oxide, bis(2,4,6-trimethylbenzoyl)-phenylphosphine oxide, bis(2,6-dimethoxybenzoyl)-2,4,4-trimethylpentyl phosphine oxide, and the like; benzoin based compounds, such as benzoin, benzoin methyl ether, benzoin ethyl ether, benzoin isopropyl ether and benzoin isobutyl ether, and the like; titanocene based compounds; acetophenone/benzophenone based hybrid photo initiators, such as 1-[4-(4-benzoylphenylsulfanyl)phenyl]-2-methyl-2-(4-methylphenylsulfinyl)propane-1-one and the like; oxime ester based photopolymerization initiators, such as 2-(O-benzoyloxime)-1-[4-(phenylthio)]-1,2-octanedione, and the like; and camphorquinone, etc.

Specific examples of radical thermal polymerization initiators may include organic peroxides and azo based compounds, etc.

Specific examples of the organic peroxides may include 1,1-bis(t-butylperoxy)-2-methylcyclohexane, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)cyclohexane, 2,2-bis(4,4-di-butylperoxycyclohexyl)propane, 1,1-bis(t-butylperoxy)cyclododecane, t-hexylperoxy isopropyl monocarbonate, t-butylperoxymaleic acid, t-butylperoxy-3,5,5-trimethylhexanoate, t-butyl peroxylaurate, 2,5-dimethyl-2,5-di(m-toluoylperoxy)hexane, t-butylperoxy isopropyl monocarbonate, t-butylperoxy 2-ethylhexyl monocarbonate, t-hexyl peroxybenzoate, 2,5-dimethyl-2,5-di(benzoylperoxy)hexane, t-butyl peroxyacetate, 2,2-bis(t-butylperoxy)butane, t-butyl peroxybenzoate, n-butyl-4,4-bis(t-butylperoxy)valerate, di-t-butyl peroxyisophthalate, α,α'-bis(t-butylperoxy)diisopropylbenzene, dicumyl peroxide, 2,5-dimethyl-2,5-di(t-butylperoxy)hexane, t-butyl cumyl peroxide, di-t-butyl peroxide, p-menthanehydroperoxide, 2,5-dimethyl-2,5-di(t-butylperoxy)hexene-3, diisopropylbenzene hydroperoxide, t-butyl trimethylsilyl peroxide, 1,1,3,3-tetramethylbutyl hydroperoxide, cumene hydroperoxide, t-hexyl hydroperoxide and t-butyl hydroperoxide, etc.

Specific examples of the azo based compounds may include 1,1-azobis(cyclohexane-1-carbonitrile), 2-(carbamoylazo)isobutyronitrile, 2-phenylazo-4-methoxy-2,4-dimethylvaleronitrile, azo di-t-octane and azo di-t-butane, etc.

The above-mentioned radical polymerization initiators may be used alone, or two or more of them may be used in combination. Furthermore, by combining a reducing agent with an organic peroxide, a redox catalyst can also be obtained.

The content proportion of the component (C) in the composition is 0.1 to 10 parts by mass, more preferably 0.5 to 7 parts by mass, and especially preferably 1 to 5 parts by mass, with respect to 100 parts by mass of the component (A) and the component (B) in total.

By making the content proportion of the component (C) to be 0.1 to 10 parts by mass, a composition has an excellent curability, and a protective film having excellent abrasion resistance and weather resistance can be obtained.

<Component (D): Ultraviolet Absorber>

The component (D) is an ultraviolet absorber, and various compounds or substances can be adopted for the component (D).

Specific examples of the ultraviolet absorber may include: triazine based ultraviolet absorbers such as 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2-ethylhexyloxy)propyl)oxy]-2-hydroxyphenyl]-4,6-bis(2,4-dimethylphenyl)-1,3,5-triazine, 2,4-bis(2-hydroxy-4-butyloxyphenyl)-6-(2,4-bis-butyloxyphenyl)-1,3,5-triazine, 2-(2-hydroxy-4-[1-octyloxycarbonylethoxy]phenyl)-4,6-bis(4-phenylphenyl)-1,3,5-triazine, and the like; benzotriazole based ultraviolet absorbers, such as 2-(2H-benzotriazol-2-yl)-4,6-bis(1-methyl-1-phenylethyl)phenol, 2-(2-hydroxy-5-tert-butylphenyl)-2H-benzotriazole, 2-[2-hydroxy-5-(2-(meth)acryloyloxyethyl)phenyl]-2H-benzotriazole, and the like; benzophenone based ultraviolet absorbers, such as 2,4-dihydroxybenzophenone, 2-hydroxy-4-methoxybenzophenone, and the like; cyanoacrylate based ultraviolet absorbers, such as ethyl-2-cyano-3,3-diphenylacrylate, octyl-2-cyano-3,3-diphenylacrylate, and the like; ultraviolet-ray-absorbing inorganic particles, such as titanium oxide particles, zinc oxide particles, tin oxide particles, and the like.

The above-mentioned ultraviolet absorbers may be used alone, or two or more of them may be used in combination.

The content proportion of the component (D) in the composition is 1 to 12 parts by mass, more preferably 3 to 12 parts by mass, and especially preferably 5 to 11 parts by mass, with respect to 100 parts by mass of the component (A) and the component (B) in total.

By making the content proportion of the component (D) to be 1 to 12 parts by mass, both the abrasion resistance and the weather resistance of a protective film can be achieved. If the component (D) is less than 1 part by mass, a protective film having sufficient weather resistance can not be obtained. The more the component (D), the higher the weather resistance of the protective film becomes, however, on the other hand, the abrasion resistance becomes poor. Furthermore, cracking is easy to occur in the protective film due to light deterioration, and hence the component (D) is set to be 12 parts by mass or less. In particular, by making the content proportion of the component (D) to be 9 to 11 parts by mass, a protective film having both excellent abrasion resistance and excellent weather resistance can be obtained.

Among these compounds, it is more preferable, from the viewpoint of weather resistance, to use an triazine based ultraviolet absorber and a benzotriazole based ultraviolet absorber in combination. Moreover, it is preferable, from the viewpoint of achieving both weather resistance and abrasion resistance of a protective film, to contain a triazine based ultraviolet absorber and a benzotriazole based ultraviolet absorber having a (meth)acryloyl group with a mass ratio of 2:8 to 8:2 and further preferably with a mass ratio of 3:7 to 7:3.

<Component (E): Organic Solvent>

The component (E) is a solvent, and various compounds can be adopted for component (E).

As the component (E), a solvent which is able to disperse or dissolve the component (A), the component (B), the component (C) and the component (D), and moreover, other component(s) described hereafter is preferable.

Specific preferable examples of the solvents may include: alcohols such as ethanol, isopropanol, and the like; alkylene glycol monoethers such as ethylene glycol monomethylether, propylene glycol monomethylether, and the like; acetone alcohols such as diacetone alcohol and the like; aromatic compounds such as toluene, xylene, and the like; esters such as propylene glycol monomethylether acetate, ethyl acetate, butyl acetate, and the like; ketones such as acetone, methyl ethyl ketone, methyl isobutyl ketone, and the like; ethers such as dibutyl ether and the like; and N-methylpyrrolidone, etc. Among these solvents, an alkylene glycol monoether such as propylene glycol monomethylether and the like is especially preferable, because, in addition to being excellent in dispersibility or solubility of various components, a polycarbonate resin is not dissolved therein in the case where a resin substrate to be coated with a composition is made of a polycarbonate resin.

The content proportion of the component (E) in the composition is 10 to 1,000 parts by mass, with respect to 100 parts by mass of the component (A) and the component (B) in total. When the mixing amount of the component (E) is too low, it is difficult to conduct uniform coating, on the other hand, when the mixing amount of the component (E) is too high, it is difficult to obtain a protective film having a sufficient thickness. Accordingly, it is desirable to suitably select the component (E) based in accordance with the coating method; however, when it is particularly desirable to specify the content of the component (E), it is preferably 50 to 500 parts by mass, more preferably 50 to 300 parts by mass, and especially preferably 70 to 200 parts by mass, from the viewpoint of productivity.

<Component (F): Hindered Amine Based Light Stabilizer>

A composition used in the present invention contains the above-mentioned components (A) to (E) as essential components, however, in order to improve the weather resistance of a protective film, a hindered amine based light stabilizer (F) (hereinafter referred to as "component (F)") may be contained.

Specific examples of the hindered amine based light stabilizer may include hindered amine based light stabilizers such as bis(1,2,2,6,6-pentamethyl-4-piperidinyl)sebacate, methyl (1,2,2,6,6-pentamethyl-4-piperidinyl)sebacate, 2,4-bis[N-butyl-N-(1-cyclohexyloxy-2,2,6,6-tetramethylpiperidin-4-yl)amino]-6-(2-hydroxyeth ylamine)-1,3,5-triazine, decanedioic acid bis(2,2,6,6-tetramethyl-1-(octyloxy)-4-piperidinyl)ester, and the like.

The content proportion of the component (F) is preferably 0.1 to 2 parts by mass, with respect to 100 parts by mass of the component (A) and the component (B) in total.

<Other Components>

A composition used in the present invention contains the above-mentioned components (A) to (E) as essential components, however, various other components may be contained as required. The above-mentioned component (F) and other components described hereafter may be used alone, or two of them may be used in combination.

To improve the storage stability, it is preferable to add a radical polymerization inhibitor into the composition.

Specific examples of the polymerization inhibitor may include hydroquinone, tert-butylhydroquinone, hydroquinone monomethylether, 2,6-di-tert-butyl-4-methylphenol, 2,4,6-tri-tert-butylphenol, benzoquinone, phenothiazine, N-nitrosophenyl hydroxylamine, an ammonium salt of N-nitrosophenyl hydroxylamine, an aluminium salt of N-nitrosophenyl hydroxylamine, copper dibutyldithiocarbamate, copper chloride, and copper sulfate, etc.

The amount of the polymerization inhibitor to be added is preferably 10 to 10,000 ppm, and more preferably 100 to 3,000 ppm, assuming that the total amount of the component (A) and the component (B) is 100 parts by mass.

To improve the heat resistance and the weather resistance of a protective film, various oxidation inhibitors may be added into the composition. As an oxidation inhibitor, a primary oxidation inhibitor such as hindered phenol based oxidation inhibitor and the like and a secondary oxidation inhibitor such as sulfur based and phosphorous based oxidation inhibitor can be exemplified.

Specific examples of the primary oxidation inhibitor may include pentaerythritol tetrakis[3-(3,5-di-tert-butyl-4-hydroxyphenyl)propionate], ethylene bis(oxyethylene)bis[3-(5-tert-butyl-4-hydroxy-m-tolyl)propionate], 1,3,5-tris[(4-tert-butyl-3-hydroxy-2,6-xylyl)methyl]-1,3,5-triazine-2,4,6 (1H,3H,5H)-trione, etc.

Specific examples of the secondary oxidation inhibitor may include didodecyl 3,3'-thiodipropionate, 4,6-bis(octylthiomethyl)-o-cresol, tris(2,4-di-tert-butylphenyl)phosphite, etc.

The preferable mixing amount of the oxidation inhibitor is 0 to 5 parts by mass, and more preferably 0 to 3 parts by mass, assuming that the total amount of the component (A) and the component (B) is 100 parts by mass.

In order to improve leveling property during coating or to improve antifouling property or slippage property of a protective film, etc., various surface conditioners may be added into the composition. As a surface conditioner, a silicone based surface conditioner or a fluorine based surface conditioner is suitable. Specific examples may include a silicone based polymer having a silicone chain and a polyalkylene oxide chain, a fluorine based polymer having a perfluoroalkyl group and a polyalkylene oxide chain, and a fluorine based polymer having a perfluoroalkyl ether chain and a polyalkylene oxide chain.

The preferable mixing amount of the surface conditioner is 0.01 to 1 part by mass, more preferably 0.02 to 0.5 part by mass, and further preferably 0.04 to 0.3 part by mass, assuming that the total amount of the component (A) and the component (B) is 100 parts by mass. By making the mixing amount of the surface conditioner to be 0.01 to 1 part by mass, surface smoothness of a coating film can be improved, thereby being able to inhibit bubbles when coating.

Into the composition, a compound other than the component (A) and the component (B) having one or more radical polymerizable unsaturated groups in one molecule may be added.

The compound having one radical polymerizable unsaturated group in one molecule (hereinafter referred to as "unsaturated compound") can be added for improving adhesion to a resin substrate.

As the radical polymerizable unsaturated group in an unsaturated compound, (meth)acryloyl group is preferable.

The mixing proportion of the unsaturated compound is preferably 20 parts by mass or less with respect to 100 parts by mass of the component (A), the component (B) and the unsaturated compound in total, from the viewpoint of preventing deterioration of abrasion resistance from occurring.

Specific examples of compounds having one radical polymerizable unsaturated group in one molecule in the unsaturated compounds may include (meth)acrylic acid, a Michael addition type dimer of acrylic acid, ω-carboxy-polycaprolactone mono(meth)acrylate, hydroxyethyl phthalate (meth)acrylate, methyl (meth)acrylate, ethyl (meth)acrylate, butyl (meth)acrylate, 2-ethylhexyl (meth)acrylate, benzyl (meth)acrylate, phenyl (meth)acrylate, (meth)acrylate of alkylene oxide adduct of phenol, (meth)acrylate of alkylene oxide adduct of alkylphenol, cyclohexyl (meth)acrylate, tert-butylcyclohexyl (meth)acrylate, 2-hydroxyethyl (meth)acrylate, 2-hydroxypropyl (meth)acrylate, 4-hydroxybutyl acrylate, (meth)acrylate of alkylene oxide adduct of paracumylphenol, orthophenylphenol (meth)acrylate, (meth)acrylate of alkylene oxide adduct of orthophenylphenol, tetrahydrofurfuryl (meth)acrylate, isobornyl (meth)acrylate, tricyclodecanemethylol(meth)acrylate, 2-hydroxy-3-phenoxypropyl (meth)acrylate, N-(2-(meth)acryloxyethyl)hexahydrophthalimide, N-(2-(meth)acryloxyethyl)tetrahydrophthalimide, N,N-dimethyl acrylamide, acryloylmorpholine, N-vinylpyrrolidone, N-vinylcaprolactam.

In the unsaturated compounds, a compound having two or more radical polymerizable unsaturated groups in one molecule (hereinafter referred to as "multi-functional unsaturated compound") may be mixed. By containing a multi-functional unsaturated compound, adhesion between a protective film and a resin substrate and the abrasion resistance of a protective film may be improved.

The number of the radical polymerizable unsaturated group in the multi-functional unsaturated compound is preferably 3 or more in one molecule, and more preferably 4 to 20, for preventing the abrasion resistance from being deteriorated.

As a multi-functional unsaturated compound, a compound having two or more (meth)acryloyl groups in one molecule is preferable, and the specific examples may include the following compounds.

Di(meth)acrylate of alkylene oxide adduct of bisphenol A, di(meth)acrylate of alkylene oxide adduct of bisphenol F, di(meth)acrylate of alkylene oxide adduct of bisphenol Z, di(meth)acrylate of alkylene oxide adduct of bisphenol S, di(meth)acrylate of alkylene oxide adduct of thiobisphenol, di(meth)acrylate of bisphenol A, di(meth)acrylate of bisphenol F, di(meth)acrylate of bisphenol Z, di(meth)acrylate of bisphenol S, di(meth)acrylate of thiobisphenol, tricyclodecanedimethylol di(meth)acrylate, ethylene glycol di(meth)acrylate, polyethylene glycol di(meth)acrylate, propylene glycol di(meth)acrylate, polypropylene glycol di(meth)acrylate, neopentyl glycol di(meth)acrylate, 1,6-hexanediol di(meth)acrylate, 1,9-nonanediol di(meth)acrylate, glycerine di(meth)acrylate, di(meth)acrylate of alkylene oxide adduct of glycerine, dimer acid diol di(meth)acrylate, cyclohexanedimethylol di(meth)acrylate, trimethylolpropane tri(meth)acrylate, tri(meth)acrylate of alkylene oxide adduct of trimethyloloropane, tri- and tetra-acrylate of pentaerythritol, tri- and tetra-acrylate of alkylene oxide adduct of pentaerythritol, ditrimethylolpropane tetra(meth)acrylate, dipentaerythritol hexa- and penta-acrylate, polyester (meth)acrylate, epoxy (meth)acrylate, urethane (meth)acrylate, and silicone resin having a terminal (meth)acryloyl group, and the like may be exemplified.

The polyester (meth)acrylate may include a dehydration condensate of a polyester polyol and (meth)acrylic acid. Examples of the polyester polyol may include a reaction product of a polyol, for example, a low molecule weight polyol such as ethylene glycol, polyethylene glycol, cyclohexanedimethylol, 3-methyl-1,5-pentaediol, propylene glycol, polypropylene glycol, 1,6-hexanediol and trimethylolpropane, and alkylene oxide adducts of these low molecule weight polyols, with an acid component, for example, an dibasic acid such as adipic acid, succinic acid, phthalic acid, hexahydrophthalic acid and terephthalic acid, or their anhydrides, and the like. Furthermore, a dehydration condensate of various dendrimer type polyols with (meth)acrylic acid can be exemplified.

Examples of the epoxy (meth)acrylate may include a (meth)acrylic acid adduct of a bisphenol A type epoxy resin, a (meth)acrylic acid adduct of hydrogenated bisphenol A type epoxy resin, a (meth)acrylic acid adduct of a phenol or cresol novolac type epoxy resin, a (meth)acrylic acid adduct of a biphenyl type epoxy resin, a (meth)acrylic acid adduct of a diglycidyl ether of a polyether such as polytetramethylene glycol, a (meth)acrylic acid adduct of a diglycidyl ether of polybutadiene, a (meth)acrylic acid adduct of an internal epoxide of polybutadiene, a (meth)acrylic acid adduct of a silicone resin having an epoxy group, a (meth)acrylic acid adduct of limonene dioxide, a (meth)acrylic acid adduct of 3,4-epoxycyclohexylmethyl-3,4-epoxycyclohexanecarboxylate, etc.

Examples of the urethane (meth)acrylate may include a compound obtained by an addition reaction of an organic polyisocyanate and a (meth)acrylate having a hydroxyl group, and a compound obtained by an addition reaction of an organic polyisocyanate, a polyol and a (meth)acrylate having a hydroxyl group.

Here, examples of the polyol may include a low molecule weight polyol, a polyether polyol, a polyester polyol, and a polycarbonate polyol, etc.

Examples of the low molecule weight polyol may include ethylene glycol, propylene glycol, neopentyl glycol, cyclohexanedimethylol, 3-methyl-1,5-pentaediol, and glycerin, etc.

Examples of the polyether polyol may include polypropylene glycol, and polytetramethylene glycol, etc.

Examples of the polyester polyol may include a reaction product of these low molecule weight polyols and/or polyether polyols with an acid component, for example, a dibasic acid such as adipic acid, succinic acid, phthalic acid, hexahydrophthalic acid and terephthalic acid, or their anhydrides, etc.

Examples of the organic polyisocyanate may include tolylene diisocyanate, xylylene diisocyanate, tetramethylxylylene diisocyanate, 4,4'-diphenylmethane diisocyanate, 4,4'-dicyclohexylmethane diisocyanate, hexamethylene diisocyanate, and isophorone diisocyanate, etc.

Examples of the (meth)acrylate having an hydroxyl group may include: a hydroalkyl (meth)acrylate, such as 2-hydroxyethyl (meth)acrylate, 2-hydroxypropyl (meth)acrylate and 4-hydroxybutyl (meth)acrylate, and the like; a multi-functional (meth)acrylate having a hydroxyl group, such as pentaerythritol tri(meth)acrylate, and dipentaerythritol penta(meth)acrylate, and the like; etc.

The above-mentioned unsaturated compounds can be used alone, or two or more of them can be used in combination.

Into a composition, an organic polymer can be added for the purposes of reducing warpage during curing while maintaining transparency, etc. As a preferable polymer, (meth)acrylic based polymers can be exemplified, and examples of a preferable constituent monomer may include methyl (meth)acrylate, cyclohexyl (meth)acrylate, (meth)acrylic acid, glycidyl (meth)acrylate, and N-(2-(meth)acryloxyethyl)tetrahydrophthalimide, etc. In the case of a polymer obtained by copolymerizing (meth)acrylic acid, a (meth)acryloyl group may be introduced into the polymer chain by adding a glycidyl (meth)acrylate.

For a vehicle member in accordance with the present invention, the material and the shape of the resin substrate are not particularly limited. For example, polycarbonate resin, polymethyl methacrylate, polyethylene terephthalate, polyvinyl chloride, epoxy resin and polyurethane resin, and the like can be exemplified. Among these materials, polycarbonate is preferable. Polycarbonate has sufficient transparency and impact resistance, and hence is suitable as a window glass for vehicle.

Furthermore, the protective film may have a thickness of 3 to 50 μm, and further preferably 5 to 30 μm. The thicker the thickness, the better the weather resistance of the protective film becomes, because the absolute amount of the component (D) contained in the protective film becomes greater. However, when the thickness is too thick, adhesion of the protective film with a resin substrate tends to be lower. Furthermore, in the case that the thickness is less than 3 μm, abrasion resistance is insufficient, and therefore such a case is not preferable.

Moreover, a vehicle member in accordance with the present invention shows an excellent adhesion without forming an undercoating layer and the like between the resin substrate and the protective film.

The usage of the vehicle member in accordance with the present invention may include interior and exterior materials for a vehicle, exterior plates for a vehicle, resin windows and the like of a vehicle such as an automobile, an industrial vehicle, a personal vehicle, a self-propellable automobile body, railway vehicle, etc.

Examples of the exterior materials may include a door molding, a framework of door mirror, a wheel cap, a spoiler, a bumper, a turn signal lens, a pillar garnish, a rear finisher, a head lamp cover, etc.

Examples of the interior materials may include an instrument panel, a console box, a meter cover, a door lock bezel, a steering wheel, a power window switch base, a center cluster, a dashboard, and a bonnet, etc.

Examples of the exterior plates may include a front fender, a door panel, a roof panel, a hood panel, a trunk lid, and a back door panel, etc.

Examples of the resin window may include a sun roof, a front glass, a side glass, a rear glass, a rear quarter glass, and a rear door quarter glass, etc.

<Method for Producing Vehicle Member>

In the following, a method for producing a vehicle member in accordance with the present invention will be described. The method for producing the vehicle member in accordance with the present invention mainly comprises a preparation step, a coating step and a curing step.

The preparation step is a step of preparing the above-mentioned composition by using various components in a predetermined mixing proportion. The composition can be produced by weighing, stirring and mixing the above-mentioned components (A) to (E) and other components including component (F) as needed, in predetermined amounts.

The coating step is a step of coating the composition onto at least part of a surface of a resin substrate.

The method of coating the composition may follow conventional methods. For example, a spray method, a spin coating method, a dip coating method and the like are preferable, and the method may be selected based on, for example, the shape of the resin substrate and so on. At this time, if the surface of the substrate is not exposed to the composition for a long period of time, a degradation of the substrate due to an organic solvent may be inhibited.

The thickness of a coating film formed by coating depends on the proportion of solid contents contained in the composition, and may be suitably selected based on the thickness of a protective film to be obtained. For example, the thickness of the coating film (before drying and curing) may be made as 6 to 100 µm. Meanwhile, if the thickness after drying or after curing is insufficient, the steps from coating to curing may be further repeated.

Between the coating step and the curing step, a drying step for drying the coating film may be conducted. The drying step may be a step of drying the component (E) by naturally drying or thermally drying.

The temperature for drying the coating film may be suitably selected based on thermal resistance of a resin substrate, and is equal to or less than the softening point of the resin. For example, in the case that a resin substrate is a polycarbonate resin, the temperature may be set in a range of 50 to 120° C.

The curing step is a step of curing the composition (coating film) to form a protective film on the surface of the resin substrate.

In the case that the composition is a light-curing composition, the composition may be coated onto a resin substrate, and then it is dried and exposed to light such as ultraviolet rays and so on. Examples of a preferable production method may include a method of irradiating a resin substrate with a light after drying while maintaining it at a high temperature.

In the case that the composition is a light-curing composition, the temperature at which the composition is irradiated with a light such as ultraviolet rays after being dried is not particularly limited provided that it is equal to or lower than the temperature of maintaining the properties of the substrate material, and a range of 50 to 200° C. is preferable. For example, in the case of a polycarbonate resin, the temperature is preferably in a range of 50 to 120° C., more preferably 60 to 110° C., further preferably 70 to 100° C., and especially preferably 80 to 100° C. By keeping the temperature of the resin substrate during irradiating with ultraviolet rays in the range of 50 to 120° C., the abrasion resistance of the protective film can be improved.

Examples of the light may include ultraviolet rays and visual rays, and ultraviolet rays are especially preferable.

Examples of an ultraviolet irradiation device may include a high pressure mercury lamp, a metal halide lamp, an electrodeless UV lamp, and an LED, etc.

The irradiation energy may be suitably set based on the kind of active energy rays or the compounding composition; for example, in the case where a high pressure mercury lamp is used, the irradiation energy of UV-A region is preferably 100 to 10,000 mJ/cm$^2$, and more preferably 1,000 to 6,000 mJ/cm$^2$.

In the case that the composition is a thermocuring composition, the composition may be coated onto a resin substrate, and may be further heated. The heating temperature is not particularly limited provided it is equal to or lower than the temperature of maintaining the properties of substrate material, and is preferably 80 to 200° C.

The heating time is preferably 10 minutes or more and 120 minutes or less. From the viewpoint of productivity, it is preferably set as 60 minutes or less, more preferably 30 minutes or less.

Furthermore, curing of the composition may be conducted in the atmospheric environment, a vacuum environment, or an inert gas environment, and preferably in a vacuum environment or an inert gas environment. In the present specification, the temperature for drying and heating is the surface temperature of a coating film, and is generally equal to the temperature of the drying or heating atmosphere.

So far, the embodiment modes of a vehicle member in accordance with the present invention have been described above, however, the present invention is not limited to the above-mentioned embodiment modes. It can be conducted in various modes to which modifications, improvements, and the like, which one of ordinary skill in the art can carry out, are performed, within a range not departing from the scope of the present invention.

EMBODIMENTS

In the following, the present invention will be described more specifically by embodiments and comparative examples. Furthermore, the present invention is not limited by these embodiments.

Meanwhile, in the following, "part(s)" means "part(s) by mass", and "%" means "mass %".

Production Example 1

Production of Component (A) (IPDI-M313)

Into a 2 L separable flask provided with a stirring device and an air-blowing tube, 1430 g of di- and tri-acrylate of 3 mol ethylene oxide adduct of isocyanuric acid [ARONIX M-313 produced by To a Gosei Co., Ltd.; hereinafter referred to as "M-313"] (containing 1 mol of diacrylate), 0.77 g of 2,6-di-tert-butyl-4-methylphenol (hereinafter referred to as "BHT") and 0.46 g of dibutyl tin dilaurate (hereinafter referred to as "DBTL") is prepared and is stirred at a liquid temperature of 70 to 75° C., while 111 g (0.5 mol) of isophorone diisocyanate (hereinafter referred to as "IPDI") is dropped into the flask.

After completion of dropping, the reaction system is stirred at 85° C. for 2 hours, and the reaction is terminated when it is confirmed by IR (infrared absorbing) analysis of reaction products that isocyanate group disappears, and an isocyanuric-ring-containing acrylate mixture is obtained. In the following, this reaction product is referred to as "IPDI-M313".

IPDI-M313 is a mixture containing urethane adduct compound (a1) as a reaction product of a compound of above-mentioned general formula (1) and isophorone diisocyanate, and tri(meth)acrylate compound (a2) represented by general formula (2) in a mass ratio of (a1):(a2)=3:7.

The compound corresponds to a compound of general formula (1) wherein all of $R^1$, $R^2$ and $R^3$ are ethylene groups, all of $R^4$ and $R^5$ are hydrogen atoms, $n^1$, $n^2$ and $n^3$ are 1, and $n^1+n^2+n^3$ is 3, and to a compound of general formula (2) wherein all of $R^6$, $R^7$ and $R^8$ are ethylene groups, all of $R^9$, $R^{10}$ and $R^{11}$ are hydrogen atoms, $n^4$, $n^5$ and $n^6$ are 1, and $n^4+n^5+n^6$ is 3.

Production Example 2

Production of Component (A) (HDI-M313)

Into the same flask as in Production Example 1, 1430 g of M-313 (containing 1 mol of diacrylate), 0.76 g of BHT and 0.45 g of DBTL are prepared and is stirred at a liquid temperature of 70 to 75° C. while 84 g (0.5 mol) of hexamethylene diisocyanate (hereinafter referred to as "HDI") is dropped into the flask.

After completion of dropping, the reaction system is stirred at 85° C. for 2 hours, and the reaction is terminated when it is confirmed by IR (infrared absorbing) analysis of reaction products that isocyanate group disappears, and an isocyanuric-ring-containing acrylate mixture is obtained. In the following, this reaction product is referred to as "HDI-M313".

HDI-M313 is a mixture containing urethane adduct compound (a1) as a reaction product of a compound of above-mentioned general formula (1) and hexamethylene diisocyanate, and tri(meth)acrylate compound (a2) represented by general formula (2) in a mass ratio of (a1):(a2)=3:7.

The compound corresponds to a compound of general formula (1) wherein all of $R^1$, $R^2$ and $R^3$ are ethylene groups, all of $R^4$ and $R^5$ are hydrogen atoms, $n^1$, $n^2$ and $n^3$ are 1, and $n^1+n^2+n^3$ is 3, and to a compound of general formula (2) wherein all of $R^6$, $R^7$ and $R^8$ all are ethylene groups, all of $R^9$, $R^{10}$ and $R^{11}$ all are hydrogen atoms, $n^4$, $n^5$ and $n^6$ are 1, and $n^4+n^5+n^6$ is 3.

Production Example 3

Production of Component (B) (Mac-TQ)

Into a reactor provided with a stirring device and a thermometer, 150 g of 1-propanol for alcohol exchange reaction and 36.53 g (0.24 mol) of tetramethoxy silane (hereinafter referred to as "TMOS") are prepared and is then stirred, while 4.37 g of 25 mass % methanol solution of tetramethylammonium hydroxide (methanol 0.1 mol, tetramethylammonium hydroxide 12 mmol) is slowly added, and the reaction is conducted at a temperature of 25° C. under pH 9 for 6 hours. After that, the reaction is further conducted for one hour while stirring at an internal temperature of 60° C. Herein, when the reaction liquid is analyzed by gas chromatography (TCD detector), a compound obtained by substituting an n-propoxy group for a methoxy group of TMOS (from a monosubstituted compound to a tetrasubstituted compound) and unreacted TMOS are detected. Only trace amount of TMOS is detected. Among these, the proportion of an organic compound having an n-propoxy group is about 100% in total. Based on the peak area of the products in gas chromatography, the substitution number of 1-propanol (the average value of the number of n-propoxy group per molecule of the compound having an n-propoxy group) is calculated as 2.7.

Next, into the above-mentioned reaction liquid, 59.62 g (0.24 mol) of 3-methacryloxypropyl trimethoxysilane is added, and 30.2 g of water is further added. Moreover, 7.88 g of 25% methanol solution of tetramethylammonium hydroxide (methanol 0.18 mol, tetramethylammonium hydroxide 21.6 mmol) is added and is stirred, while the reaction is conducted at a temperature of 25° C. under pH 9 for 24 hours. After that, 22.2 g of 10 mass % aqueous solution of nitric acid (35.3 mmol) is added for neutralization. The neutralized liquid is then added into a mixed liquid of 120 g of diisopropyl ether and 180 g of water for extraction. After the diisopropyl ether layer is water-washed to remove salts and excessive acid, 11.5 mg of N-nitroso phenylhydroxylamine aluminium salt [trade name "Q-1301", produced by Wako Pure Chemical Industries, Ltd.; hereinafter referred to as "Q-1301"] as polymerization inhibitor is added. The organic solvent is removed by distillation under reduced pressure from the resultant diisopropyl ether solution to obtain a colorless transparent solid of the organosilicon compound (B1). The yield is 57.72 g. In the following, the yield obtained in this way is referred to as "separation yield".

1H-NMR analysis is performed with respect to the organosilicon compound (B1), and it is confirmed that the resultant organosilicon compound (B1) is a co-polycondensate obtained by reacting the compound (b1) and the compound (b2) stoichiometrically.

The proportion of alkoxy group (n-propoxy group bonded to silicon atom) calculated from 1H-NMR chart of the organosilicon compound (B1) corresponds to 2.5% with respect to the total of alkoxy group contained in the raw materials added.

Furthermore, Mn is 9,600.

In the following, this reaction product is referred to as "Mac-TQ".

Production Example 4

Production of Multi-Functional Urethane Acrylate not Belonging to the Component (A) (IPDI-M305)

Into the same flask as in Production Example 1, 993 g of tri- and tetra-acrylate of pentaerythritol [ARONIX M-305 produced by To a Gosei Co., Ltd.; hereinafter referred to as "M-305"] (containing 2 mol of triacrylate), 0.61 g of BHT and 0.36 g of DBTL are prepared, and is stirred at a liquid temperature of 70 to 75° C., while 222 g (1.0 mol) of IPDI is dropped into the flask.

After completion of dropping, the reaction system is stirred at 85° C. for 2 hours, and the reaction is terminated when it is confirmed by IR (infrared absorbing) analysis of reaction products that isocyanate group disappears, and a multi-functional urethane acrylate is obtained.

In the following, this reaction product is referred to as "IPDI-M305".

Production Example 5

Production of Multi-Functional Urethane Acrylate not Belonging to the Component (A) (HDI-M305)

Into the same flask as in Production Example 1, 993 g of M-305 (containing 2 mol of triacrylate), 0.58 g of BHT and 0.35 g of DBTL are prepared, and is stirred at a liquid temperature of 70 to 75° C., while 168 g (1.0 mol) of HDI is dropped into the flask.

After completion of dropping, the reaction system is stirred at 85° C. for 2 hours, and the reaction is terminated when it is confirmed by IR (infrared absorbing) analysis of reaction products that isocyanate group disappears, and a multi-functional urethane acrylate is obtained.

In the following, this reaction product is referred to as "HDI-M305".

Production Example 6

Production of Organosilicon Compound Having a Methacryloyl Group not Belonging to the Component (B)

Into a reactor provided with a stirring device and a thermometer, 290 g of 2-propanol and 248.48 g (1 mol) of 3-methacryloxypropyl trimethoxysilane are prepared, then, 57.69 g of 1.6 mass % aqueous solution of tetramethylammonium hydroxide (water 3 mol, tetramethylammonium hydroxide 10 mmol) is slowly added while stirring, and the reaction is conducted at a temperature of 25° C. and pH9 for 1 hour. After that, the reaction liquid is neutralized by adding 6.62 g of 10 mass % aqueous solution of nitric acid. Moreover, 17.6 mg of Q-1301 is then added as polymerization inhibitor. Next, the organic solvent and water are removed by distillation under reduced pressure. After that, the resultant residue is dissolved in diisopropyl ether, and is water-washed to remove salts and excessive acid, and 17.3 mg of the above-mentioned polymerization inhibitor is added thereto. Subsequently, the solvent is then removed by distillation under reduced pressure from the resultant diisopropyl ether solution so as to obtain a colorless transparent liquid (a liquid which has extremely high viscosity and hence has low flowability) organosilicon compound. Its separation yield is 173.86 g.

1H-NMR analysis is performed with respect to the organosilicon compound synthesized as described above, and it is confirmed that a methacryloyl group is present.

The proportion of alkoxy group (iso-propoxy group bonded to silicon atom) calculated from 1H-NMR chart of the resultant organosilicon compound corresponds to 0.8% with respect to the total of alkoxy group contained in the raw materials added.

Furthermore, Mn of the resultant organosilicon compound is 2,700.

In the following, this reaction product is referred to as "Mac-SQ".

<Preparation of a Light-Curing Coating Agent Composition>

The components shown in Table 1 and Table 2 are stirred and mixed in conventional way to obtain a light-curing coating agent composition (Composition #E1 to E5 and Composition #C1 to C9).

Meanwhile, the numeric values in Table 1 and Table 2 mean part by mass. The abbreviations in these tables mean the following compounds.

Abbreviations
Component (C)
"Irg-819": radical photopolymerization initiator produced by Chiba Japan Co., Ltd., under trade name of "Irgacure 819"; bis(2,4,6-trimethylbenzoyl)-phenylphosphine oxide.

"Irg-184": radical photopolymerization initiator produced by Chiba Japan Co., Ltd., under trade name of "Irgacure 184"; 1-hydroxy-cyclohexyl-phenyl-ketone.

Component (D)
"T-400": triazine based ultraviolet absorber produced by Chiba Japan Co., Ltd., under trade name of "TINUVIN 400"; containing 85% of 2-[4-[(2-hydroxy-3-dodecyloxypropyl)oxy]-2-hydroxyphenyl]-4,6-bis(2,4-dimethylphenyl)-1,3,5-triazine and 2-[4-[(2-hydroxy-3-tridecyloxypropyl)oxy]-2-hydroxyphenyl]-4,6-bis(2,4-dimethylphenyl)-1,3,5-triazine in total as active ingredients, and 15% of propylene glycol monomethylether as solvent.

"T-405": triazine based ultraviolet absorber produced by Chiba Japan Co., Ltd., under trade name of "TINUVIN 405"; 2-[4-[(2-hydroxy-3-(2-ethylhexyloxy)propyl)oxy]-2-hydroxyphenyl]-4,6-bis(2,4-dimethylphenyl)-1,3,5-triazine.

"T-479": triazine based ultraviolet absorber produced by Chiba Japan Co., Ltd., under trade name of "TINUVIN 479"; 2-(2-hydroxy-4-[1-octyloxycarbonylethoxy]phenyl)-4,6-bis(4-phenylphenyl)-1,3,5-triazine.

"RUVA-93": benzotriazole based ultraviolet absorber having a methacryloyl group produced by Otsuka Chemical Co., Ltd., under trade name of "RUVA-93"; 2-[2-hydroxy-5-(2-methacryloyloxyethyl)phenyl]-2H-benzotriazole.

Component (E)
"PGM": propylene glycol monomethylether.

Component (F)
"T-123": hindered amine based light stabilizer produced by Chiba Japan Co., Ltd., under trade name of "TINUVIN 123"; decanedioic acid bis(2,2,6,6-tetramethyl-1-(octyloxy)-4-piperidinyl)ester.

Meanwhile, the structures of the active ingredients of the component (D) and the component (F) are shown as follows.

[Chem 7]

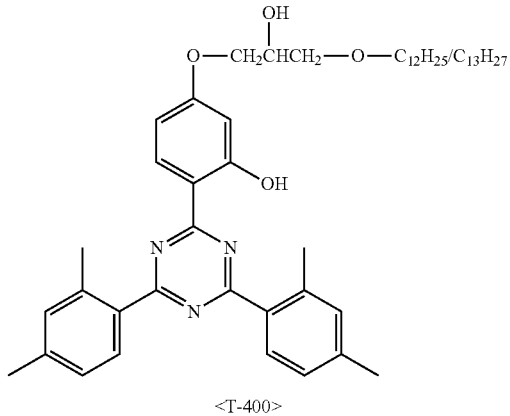

<T-400>

[Chem 8]

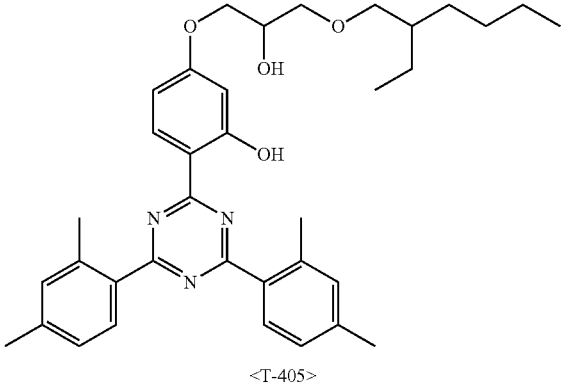

<T-405>

[Chem 9]

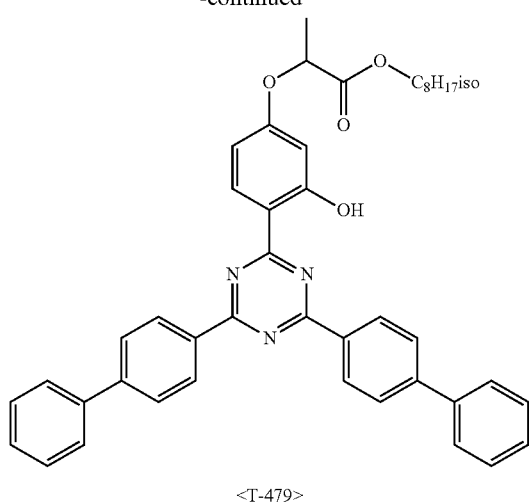
<T-479>
[Chem 10]
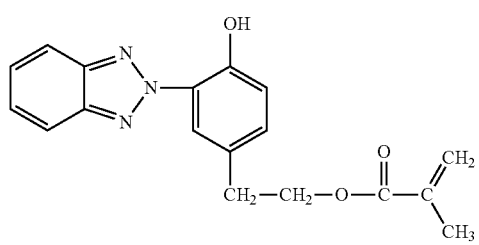
<RUVA-93>
[Chem 11]
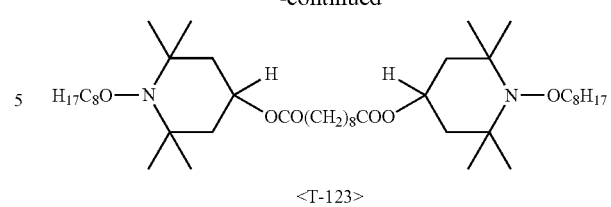
<T-123>
TABLE 1
|   |   | Composition No. | | | | |
|---|---|---|---|---|---|---|
|   |   | #E1 | #E2 | #E3 | #E4 | #E5 |
| (A) | IPDI-M313 | 75 | 75 | 75 | 87.5 | — |
|   | HDI-M313 | — | — | — | — | 87.5 |
| (B) | Mac-TQ | 25 | 25 | 25 | 12.5 | 12.5 |
| (C) | Irg-819 | 2 | 2 | 2 | 2 | 2 |
|   | Irg-184 | 5 | — | — | — | — |
| (D) | T-400 | 5 | — | — | — | — |
|   | T-405 | — | 5 | — | — | — |
|   | T-479 | — | 5 | 5 | 5 | 5 |
|   | RUVA-93 | — | — | 5 | 5 | 5 |
| (E) | PGM | 150 | 150 | 150 | 150 | 150 |
| (F) | T-123 | 1 | 1 | 1 | 1 | 1 |
The composition #E1 contains 5 parts of T-400, however, because the ratio of the active ingredients is 85%, it hence contains 4.25 parts of T-400 as the component (D).
TABLE 2
|   |   | Composition No. | | | | | | | | |
|---|---|---|---|---|---|---|---|---|---|---|
|   |   | #C1 | #C2 | #C3 | #C4 | #C5 | #C6 | #C7 | #C8 | #C9 |
| (A) | IPDI-M313 | 75 | 60 | 100 | 100 | — | — | — | — | 75 |
|   | HDI-M313 | — | — | — | — | 100 | — | — | 50 | — |
| (A)' | IPDI-M305 | — | — | — | — | — | 100 | — | — | — |
|   | HDI-M305 | — | — | — | — | — | — | 100 | 50 | — |
| (B) | Mac-TQ | — | 40 | — | — | — | — | — | — | 25 |
| (B)' | Mac-SQ | 25 | — | — | — | — | — | — | — | — |
| (C) | Irg-819 | 2 | 2 | 2 | 2 | 2 | 2 | 2 | 2 | 2 |
|   | Irg-184 | 5 | — | — | — | — | — | — | — | — |
| (D) | T-400 | 5 | — | — | — | — | — | — | — | — |
|   | T-405 | — | 5 | 5 | — | 5 | 5 | 5 | 5 | — |
|   | T-479 | — | 5 | 5 | 5 | 5 | 5 | 5 | 5 | 5 |
|   | RUVA-93 | — | — | — | 5 | — | — | — | — | 10 |
| (E) | PGM | 150 | 150 | 150 | 150 | 150 | 150 | 150 | 150 | 150 |
| (F) | T-123 | 1 | 1 | 1 | 1 | 1 | 1 | 1 | 1 | 1 |

The composition #C1 contains 5 parts of T-400, however, because the ratio of the active ingredients is 85%, it hence contains 4.25 parts of T-400 as the component (D).

<Preparation of a Protective Film>

A compositions shown in Table 1 and Table 2 is coated onto a surface of a 10 cm square polycarbonate resin plate using a bar coater so that a thickness of the coating film after drying is about 10 μm, and after the resultant film is dried for 10 minutes using a hot air dryer at 100° C., it is immediately (at a coating film surface temperature of 90° C.) irradiated with ultraviolet light to prepare a protective film.

For ultraviolet irradiation, an electrodeless lamp (H bulb) produced by Fusion UV Systems Japan Co., Ltd. is used, wherein the lamp height is set as the focal length (10 cm) of the light collecting mirror, and 10 passes of irradiation are preformed at a conveyor speed of 10 m/min. The irradiation energy per pass is 500 mJ/cm$^2$ (totally 5,000 mJ/cm$^2$) in a region of UA-A of UVPOWER PUCK produced by EIT. Furthermore, the peak illumination intensity is 1,600 mW/cm$^2$ in UV-A region.

The abrasion resistance, the adhesion and the weather resistance of the resultant protective film are evaluated according to methods described below. The evaluation results are shown in Table 3.

Abrasion Resistance

Taber abrasion test is performed in accordance with ASTM D-1044. The abrasion resistance is evaluated by measuring haze difference ΔH(%) before and after taber abrasion test using a taber abrasion tester. Herein, the abrasion wheel is CS-10F, each of the load is 500 g, and the rotation number is 500. The smaller the ΔH(%) is, the better abrasion resistance is evaluated.

Adhesion

Using a cutter knife to cut 11 slits longitudinally and 11 slits transversally at 2 mm interval in a protective film, and a 100-square grid is formed. A cellophane tape produced by Nichiban Co., Ltd. is stuck to the grid, and the cellophane tape is peeled in accordance with JIS K5400. The higher the proportion (%) of residual film after peeling the cellophane tape is, the better the adhesion is evaluated.

Weather Resistance

An acceleration test of 5,000 hours is performed in a carbon arc type Sunshine Weathemeiter in accordance with JIS K5400, a protective film is observed by eyes, and the time when crack and natural peeling are confirmed is recorded. The longer the time is, the better the weather resistance is evaluated. The weather resistance is evaluated in the following way.
Wherein, in the table,
◎: Neither crack nor natural peeling occurred even after 5,000 hours.
○: Of crack and natural peeling, the one first confirmed occurs at 4,000 hours or more and 5,000 hours or less.
Δ: Of crack and natural peeling, the one first confirmed occurs at 3,000 hours or more and less than 4,000 hours.
X: Of crack and natural peeling, the one first confirmed occurs at less than 3,000 hours.

TABLE 3

| | Composition No. | Abrasion resistance ΔH (%) | Adhesion Residual film (%) | Weather resistance Crack (hr.) | Weather resistance Natural peeling (hr.) | Evaluation |
|---|---|---|---|---|---|---|
| Enbodiment 1 | #E1 | 5.0 | 100 | 4000 | 3500 | Δ |
| Enbodiment 2 | #E2 | 8.9 | 100 | 4000 | 4000 | ○ |
| Enbodiment 3 | #E3 | 7.3 | 100 | 5000< | 5000< | ◎ |
| Enbodiment 4 | #E4 | 8.6 | 100 | 5000< | 5000< | ◎ |
| Enbodiment 5 | #E5 | 7.9 | 100 | 5000< | 5000< | ◎ |
| Comp. Ex. 1 | #C1 | 23.1 | 100 | 2500 | 2500 | X |
| Comp. Ex. 2 | #C2 | 7.3 | 100 | 2000 | 2000 | X |
| Comp. Ex. 3 | #C3 | 30.9 | 100 | 5000 | 5000< | ○ |
| Comp. Ex. 4 | #C4 | 23.0 | 100 | 5000 | 4000 | ○ |
| Comp. Ex. 5 | #C5 | 17.3 | 100 | 4500 | 5000< | ○ |
| Comp. Ex. 6 | #C6 | 8.9 | 100 | 2500 | 2500 | X |
| Comp. Ex. 7 | #C7 | 6.5 | 100 | 2000 | 2500 | X |
| Comp. Ex. 8 | #C8 | 11.8 | 100 | 3000 | 5000< | Δ |
| Comp. Ex. 9 | #C9 | 13.7 | 100 | 2000 | 5000 | X |

All of Embodiments 1 to 5 and Comparative Examples 1 to 9 (Comp. Ex. 1 to 9) are confirmed to have transparency equivalent to that of a substrate before forming a protective film thereon by eyes.

As shown in Table 3, Embodiments 1 to 5 which have a protective film formed using #E1 to #E5 compositions on a surface achieves both abrasion resistance and weather resistance, and excellent adhesion to a resin plate. From this result, it is speculated that a protective film having properties equivalent to those of Embodiments 1 to 5 can be obtained by using a composition containing 73 to 90 parts of the component (A), 10 to 27 parts of the component (B), 1 to 8 parts of the component (C) and 3 to 12 parts of the component (D), when the total of the component (A) and the component (B) is taken as 100 parts.

Embodiments 3 to 5 prepared using #E3 to #E5 have excellent weather resistances. It is believed that it is because a triazine based ultraviolet absorber, i.e., T-479, and a benzotriazole based ultraviolet absorber having a (meth)acryloyl group, i.e., RUVA-93, are used in combination as the component (D).

Furthermore, Embodiment 3, compared to Embodiment 2, has better abrasion resistance in addition to the weather resistance. That is, it is found that not only the weather resistance but also the abrasion resistance are improved by using a triazine based ultraviolet absorber and a benzotriazole based ultraviolet absorber having a (meth)acryloyl group in combination.

Meanwhile, #C4 is a composition containing T-479 and RUVA-93, like #E3 to #E5. However, when comparing Comparative Example 4 having a protective film prepared using #C4 with Comparative Example 3 having a protective film prepared using #C3 containing T-405 as a triazine based ultraviolet absorber instead of RUVA-93, in terms of weather resistance, it is found that Comparative Example 3 is better than Comparative Example 4.

That is, a combination of a triazine based ultraviolet absorber and a benzotriazole based ultraviolet absorber having a (meth)acryloyl group does not necessarily improve weather resistance. In other words, the improvement effects of the weather resistance and the abrasion resistance caused by using a triazine based ultraviolet absorber and a benzotriazole based ultraviolet absorber having a (meth)acryloyl group in combination are specific effects of a composition used in the present invention.

Furthermore, it is speculated that a protective film having properties equivalent to those of Embodiments 3 to 5 can be obtained by a mass ratio of T-479 and RUVA-93 of 4:6 to 6:4.

Comparative Example 1 prepared using composition #C1 containing silsesquioxane as the component (B)' instead of the component (B) of composition #E1 is insufficient in either abrasion resistance or weather resistance. Furthermore, composition #C2 contains 60 parts of the component (A) and 40 parts of the component (B). By containing 40 parts of the component (B), Comparative Example 2 prepared using composition #C2 is significantly deteriorated in weather resistance compared to Embodiment 2.

Compositions #C6 and #C7 contain the component (A)' which is a urethane acrylate having an excellent abrasion resistance, however, Comparative Examples 6 and 7 prepared using them have low weather resistances. Comparative Example 8 prepared using composition #C8 which uses the component (A) and the component (A)' in combination is slightly better in weather resistance compared to Comparative Examples 6 and 7, however both abrasion resistance and weather resistance are still insufficient.

Furthermore, Comparative Example 9 prepared using composition #C9 which contains excessive amount of the component (D) of 15 parts in total is not good in either abrasion resistance or weather resistance.

<Window Glass for Vehicle>

Figure 2:
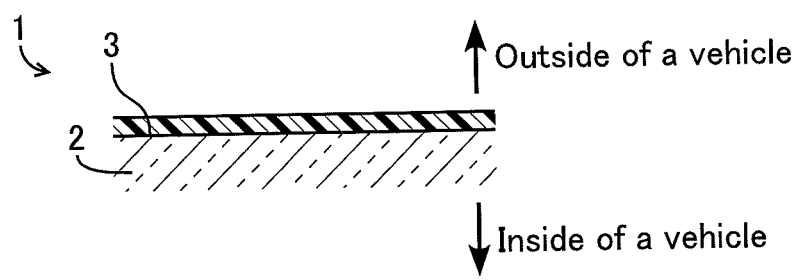
FIG. 2 is a schematic cross-sectional view showing a window glass as a vehicle member in accordance with the present invention.

A specific example using the vehicle member in accordance with the present invention as a window glass for vehicle (sunroof) is described with FIGS. 1 and 2.

FIG. 1 is a schematic perspective view showing a sunroof. The sunroof comprises a window glass 1 and a framework-like frame 4 for supporting peripheral parts of the window glass 1. In order to ensure air tightness inside a vehicle, a loop-like weather stripe 5 formed by a flexible material is attached to the peripheral parts of the window glass 1 and the frame 4. The sunroof is freely openably and closably attached to the opening formed in a roof panel of the vehicle.

FIG. 2 is a schematic cross-sectional view showing the window glass 1. The window glass 1 comprises a glass main body 2 formed of polycarbonate, and a protective film 3 formed on at least a surface on the outer side of the vehicle of the glass main body 2. The protective film 3 is obtained by curing any one of compositions #E1 to #E5 in above-mentioned steps.

What is claimed is:

1. A vehicle member having a resin substrate and a protective film which is formed on at least a part of a surface of the resin substrate, wherein
said protective film is obtained by curing a curable coating agent composition which contains, with respect to 100 parts by mass of a component (A) as follows and a component (B) as follows in total, 95 to 65 parts by mass of the component (A), 5 to 35 parts by mass of the component (B), 0.1 to 10 parts by mass of a radical polymerization initiator as a component (C), 1 to 12 parts by mass of an ultraviolet absorber as a component (D) and 10 to 1,000 parts by mass of an organic solvent as a component (E),
wherein the component (A) is an isocyanuric ring-containing (meth)acrylate mixture comprising a urethane adduct compound (a1) obtained by addition reaction of a hydroxyl-containing di(meth)acrylate compound represented by following general formula (1) and an isocyanate compound having two or more isocyanate groups in its molecule, and
a tri(meth)acrylate compound (a2) represented by following general formula (2),

[Chem 1]

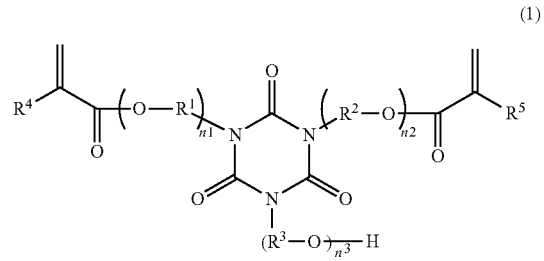

wherein in formula (1), $R^1$, $R^2$ and $R^3$ each independently represents a divalent organic group having a carbon atom number of 2 to 10, $R^4$ and $R^5$ each independently represents a hydrogen atom or a methyl group, $n^1$, $n^2$ and $n^3$ each independently represents a number of 1 to 3, and $n^1+n^2+n^3=3$ to 9,

[Chem 2]

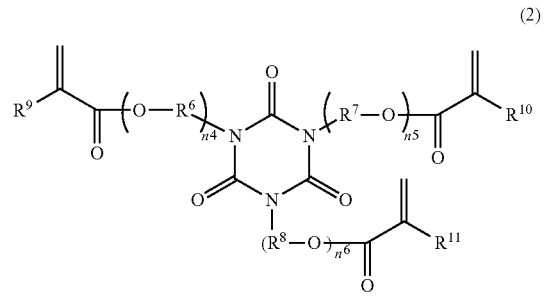

wherein in formula (2), $R^6$, $R^7$ and $R^8$ each independently represents a divalent organic group having a carbon atom number of 2 to 10, $R^9$, $R^{10}$ and $R^{11}$ each independently represents a hydrogen atom or a methyl group, $n^4$, $n^5$ and $n^6$ each independently represents a number of 1 to 3, and $n^4+n^5+n^6=3$ to 9, wherein the component (B) is an organosilicon compound obtained by hydrolyzing and co-polycondensing a silicon compound (b1) represented by following general formula (3) and a silicon compound (b2) represented by following general formula (4) in a ratio of 0.3 to 1.8 mol with respect to 1 mol of the compound (b1),

[Chem 3]

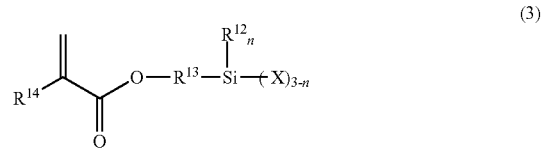

wherein in formula (3), $R^{12}$ is an organic group having an alkyl group having a carbon atom number of 1 to 6, an aralkyl group having a carbon atom number of 7 to 10, or an aryl group having a carbon atom number of 6 to 10, $R^{13}$ is a divalent saturated hydrocarbon group having a carbon atom number of 1 to 6, $R^{14}$ is a hydrogen atom or a methyl group, X is a hydrolyzable group, the X's may be the same or different, and n is 0 or 1, $$SiY_4 \quad (4)$$

wherein in formula (4), Y is a siloxane-bond-forming group, and the Y's may be the same or different.

2. The vehicle member as claimed in claim 1, wherein said component (D) comprises a triazine based ultraviolet absorber (d1) and a benzotriazole based ultraviolet absorber having a (meth)acryloyl group (d2).

3. The vehicle member as claimed in claim 2, wherein the mass ratio of said ultraviolet absorber (d1) and said ultraviolet absorber (d2) is 2:8 to 8:2.

4. The vehicle member as claimed in claim 1, wherein the curable coating agent composition further comprises 0.1 to 2 parts by mass of a hindered amine based light stabilizer as a component (F), with respect to 100 parts by mass of said component (A) and said component (B) in total.

5. The vehicle member as claimed in claim 1, wherein in said component (A), said compound (a1) is a compound of general formula (1) wherein $R^1$, $R^2$ and $R^3$ each is an alkylene group having a carbon atom number of 2 to 4, $n^1$, $n^2$ and $n^3$ are 1, and $n^1+n^2+n^3=3$, and said compound (a2) is a compound of general formula (2) wherein $R^6$, $R^7$ and $R^8$ each is an alkylene group having a carbon atom number of 2 to 4, $n^4$, $n^5$ and $n^6$ are 1, and $n^4+n^5+n^6=3$.

6. The vehicle member as claimed in claim 1, wherein in said component (B), said compound (b1) is a compound of general formula (3) wherein X is an alkoxy group and n is 0, and said compound (b2) is a compound of general formula (4) wherein Y is an alkoxy group.

7. The vehicle member as claimed in claim 1, wherein said composition is a light-curing coating agent composition cured by light irradiation wherein said component (C) is a radical photopolymerization initiator.

8. The vehicle member as claimed in claim 1, wherein in said component (A), the mass ratio of said compound (a1) and said compound (a2) is 1:9 to 6:4.

9. The vehicle member as claimed in claim 1, wherein said component (B) is an organosilicon compound obtained by hydrolyzing and co-polycondensating said silicon compound (b1) and said silicon compound (b2) under alkaline conditions.

10. The vehicle member as claimed in claim 1, wherein said protective film is brought into direct contact with a surface of said resin substrate.

11. The vehicle member as claimed in claim 1, wherein the vehicle member is a resin window for vehicle.

12. The vehicle member as claimed in claim 1, wherein the vehicle member is an interior/exterior member for vehicle.

13. A method for producing a vehicle member having excellent weather resistance and abrasion resistance, where said method includes:

a preparation step of preparing a curable coating agent composition which contains, with respect to 100 parts by mass of a component (A) as follows and a component (B) as follows in total, 95 to 65 parts by mass of the component (A), 5 to 35 parts by mass of the component (B), 0.1 to 10 parts by mass of a radical polymerization initiator as a component (C), 1 to 12 parts by mass of an ultraviolet absorber as a component (D) and 10 to 1,000 parts by mass of an organic solvent as a component (E), a coating step of coating said curable coating agent composition onto at least a part of a surface of a resin substrate, and a curing step of curing said curable coating agent composition to form a protective film on the surface of said resin substrate, wherein the component (A) is an isocyanuric ring-containing (meth)acrylate mixture comprising a urethane adduct compound (a1) obtained by addition reaction of a hydroxyl-containing di(meth)acrylate compound represented by following general formula (1) and an isocyanate compound having two or more isocyanate groups in its molecule, and a tri(meth)acrylate compound (a2) represented by following general formula (2),

[Chem 4]

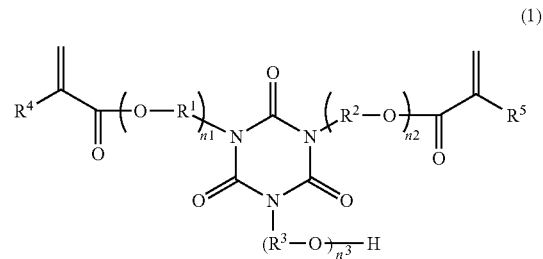

(1)

wherein in formula (1), $R^1$, $R^2$ and $R^3$ each independently represents a divalent organic group having a carbon atom number of 2 to 10, $R^4$ and $R^5$ each independently represents a hydrogen atom or a methyl group, $n^1$, $n^2$ and $n^3$ each independently represents a number of 1 to 3, and $n^1+n^2+n^3=3$ to 9,

[Chem 5]

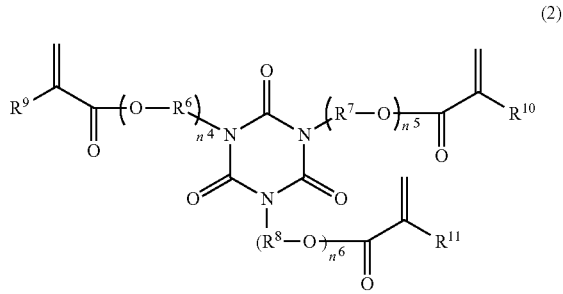

(2)

wherein in formula (2), $R^6$, $R^7$ and $R^8$ each independently represents a divalent organic group having a carbon atom number of 2 to 10, $R^9$, $R^{10}$ and $R^{11}$ each independently represents a hydrogen atom or a methyl group, $n^4$, $n^5$ and $n^6$ each independently represents a number of 1 to 3, and $n^4+n^5+n^6=3$ to 9, the component (B) is an organosilicon compound obtained by hydrolyzing and co-polycondensing a silicon compound (b1) represented by following general formula (3) and a silicon compound (b2) represented by following general formula (4) in a ratio of 0.3 to 1.8 mol with respect to 1 mol of the compound (b1),

[Chem 6]

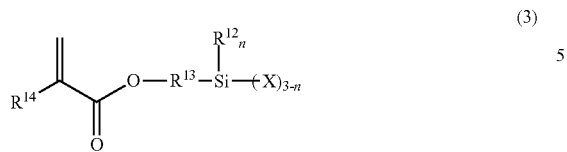
(3)

wherein in formula (3), $R^{12}$ is an organic group having an alkyl group having a carbon atom number of 1 to 6, an aralkyl group having a carbon atom number of 7 to 10, or an aryl group having a carbon atom number of 6 to 10, $R^{13}$ is a divalent saturated hydrocarbon group having a carbon atom number of 1 to 6, $R^{14}$ is a hydrogen atom or a methyl group, X is a hydrolyzable group and the X's may be the same or different, and n is 0 or 1, $$SiY_4 \quad (4)$$

wherein in formula (4), Y is a siloxane-bond-forming group, and the Y's may be the same or different.

* * * * *